United States Patent [19]

Da Silva et al.

[11] Patent Number: 5,781,862

[45] Date of Patent: Jul. 14, 1998

[54] METHOD FOR CONTROLLING FUNCTIONS FOR CHANGING RADIO AREAS OF COMMUNICATIONS TERMINAL DEVICES

[75] Inventors: Mauricio Da Silva, Dortmund; Ulrich Leimkoetter, Gelsenkirchen, both of Germany

[73] Assignee: Siemens Aktiengesellschaft, Munich, Germany

[21] Appl. No.: 631,552

[22] Filed: Apr. 12, 1996

[30] Foreign Application Priority Data

Apr. 12, 1995 [DE] Germany .................. 195 13 959.3

[51] Int. Cl.$^6$ ............................................. H04Q 7/20
[52] U.S. Cl. ................... 455/436; 455/524; 370/331
[58] Field of Search .......................... 455/436, 438, 455/439, 440, 442, 443, 527, 560, 517, 445; 370/331, 332, 242, 328, 329

[56] References Cited

U.S. PATENT DOCUMENTS 5,222,248  6/1993  McDonald et al. .
5,428,816  6/1995  Barnett et al. ................. 455/33.2

FOREIGN PATENT DOCUMENTS 0 519 106 A1  12/1992  European Pat. Off. .
0 570 643 A1  11/1993  European Pat. Off. .
0519106       12/1992  Germany .
WO 95/01071   1/1995   WIPO .

OTHER PUBLICATIONS

Everitt, D. et al., Handoff effects in microcellular system, IEEE, pp. 654–657, May 1992.

*Primary Examiner*—Andrew I. Faile
*Assistant Examiner*—Christopher Onuaku
*Attorney, Agent, or Firm*—Hill & Simpson

[57] ABSTRACT

In a method for controlling functions for a change of radio area of communications terminal devices, in a program module structure of a subscriber module of wireless communications systems, a higher priority is allocated to the program modules for processing of the radio area change process than to the program modules for processing the communications protocols and to the program modules for switching. The program modules are processed according to their priority. Through the preferential treatment of the handover process, the system resources, in particular the processing resources, are concentrated on the handover process. In the context of the total load capacity of the subscriber module of the wireless communications system, the communications connection during a handover process is thus maintained with high reliability by effecting a rapid changeover to the new communications path, whereby disturbances are also avoided by means of the rapid changeover.

11 Claims, 3 Drawing Sheets

METHOD FOR CONTROLLING FUNCTIONS FOR CHANGING RADIO AREAS OF COMMUNICATIONS TERMINAL DEVICES

BACKGROUND OF THE INVENTION

Wireless communications systems serve for the setting up and disconnecting of wireless communications connections, as well as for the support of further performance features during communications connections to and from subscribers in the radio area of base stations of the respective wireless communication system. A wireless communications system thereby comprises a central communications installation, which is, as a rule, connected in a network with other communications installations, and which has a central switching control and at least one subscriber module arranged in the central communications installation and connected with the central switching control. At least one base station connected with a subscriber module, as well as comprising communications terminal devices are also provided. The connection of communications terminal devices to base stations takes place respectively via a wireless communications connection. A wireless communications system of this type is, for example, known from the published patent application DE 43 09 848 7 corresponding to U.S. patent application Ser. No. 08/214,570.

Furthermore, from EP 0 519 106 A1 a program module structure for program-controlled communications devices in connection with the wire-connected connection of communications terminal devices is known, in which priorities are allocated to the program modules and the program modules are processed according to their priority. The program modules for the recognition and safeguarding of the signaling information and the management of the communication exchange on the bus structure are assigned the highest priority. The temporal control of signaling tones is assigned the second-highest priority, while the processes for event safeguarding and event output have the third-highest priority. Processes with switching tasks are assigned the fourth-highest priority, and the fifth-highest priority is assigned to the time management of the different processes and to the uniformly distributed forwarding of the safeguarded events to the active users. In contrast, management and test tasks have the lowest priority.

This program module structure determines the significances of the different processes for a communications system with the exclusively wire-connected connection of communications terminal devices. The development of wireless communications systems, e.g. according to the DECT standard (Digital European Cordless Telecommunications), adds to the performance feature known from EP 0 519 106 A1 among other things another performance feature, according to which during a communications connection the radio area can be changed (handover). Thus a new connection path is set up.

The change of radio area makes it possible for a communications terminal device, given an existing communications connection, to set up a parallel communications path to another base station, and, if this communications path comprises better radio characteristics, to change over to the new communications path. Deteriorations of the transmission quality on the original communication path can thus be avoided, and a constant high quality of the communications connection can thus be achieved. As a rule, on the original communications path disturbances appear (the disturbances can lead to an interruption of the communications connection) that are to be avoided before they become perceptible to the subscriber.

This new feature of the radio area change cannot be satisfied by means of a treatment of the handover process in the context of the switching processes explained above. To this extent, the priority structure solution known from EP 0 519 106 A1 is not sufficient, and the handover process is to be integrated into the remaining processes. During the handover process, disturbances of the speech connection in the course of the change of radio area and delays in the signaling from the subscriber (i.e., the user of the communications terminal device KE in wireless communications systems) are not supposed to be perceptible. In addition, it should thereby be possible to incorporate the call and tone signaling at the communications terminal devices into the priority-oriented program structure.

SUMMARY OF THE INVENTION

An object of the invention is to indicate a method for controlling the radio area change of communications terminal devices of a wireless communications system connected to a subscriber module via base stations, in which the communications connection is maintained with a high degree of security during the change of radio area.

According the invention, a method is provided for controlling functions for change of radio area of communication terminal devices and a program module structure of a subscriber module of a wireless communication system. The subscriber module is connected at a subscriber with at least one base station for a wireless connection of at least one communications terminal device, and at a switching side the subscriber module is connected with a central communications installation for creation of access to a communications network. A highest priority is assigned to program modules for controlling switching-oriented components of the subscriber module and to program modules for controlling physical communication connections of the subscriber module with a central switching control and with the at least one base station. A second highest priority is assigned to program modules for signaling generation of tone and call signals, to program modules for processing of a radio area change process of the communications terminal device connected Tirelessly to a base station, to program modules for safe guarding communication with the communications terminal devices, and with the central communications installation. A third highest priority is assigned to program modules for processing communications protocols with the base stations and the communications terminal devices, to program modules for event recognition and event allocation of events transmitted by the communications terminal devices, for switching . A fourth highest priority is assigned to an arbitration program module for reading out of safeguarded allocated events and for calling up of a program module designated by a located event. A lowest priority is assigned to program modules having management and test functions. The program modules are processed according to the assigned priorities.

Through the preferential treatment of the handover process by means of the assignment of a high priority to this process in comparison to other protocol treatment and switching functions, the system resources, in particular the processing resources, are concentrated on the handover process. In the context of the total load capacity of the subscriber module of the wireless communications system, the communications connection is thus maintained with high security during a handover process by effecting a rapid changeover to the new communications path, whereby disturbances are also avoided by means of the rapid changeover.

By means of the method of the invention, a system surface of the wireless communications system arises that is acceptable or reasonable for the subscriber. Performance features that are perceptible to the subscriber and are felt to be important, such as e.g. the quality of the communications connection during the motion of the subscriber (thus during a change of radio area) and the call and tone signaling, are to be ensured for the subscriber with high security and without inexplicable delays. The amount of time needed for a connection set-up is also perceptible to the subscriber, but smaller delays are more understandable.

The system surface, i.e. the operating surface of the functions of the communications terminal device, is acceptable or reasonable for the subscriber because the perceptible performance features are given higher priority:

the processing of the handover process;

the signaling generation of tone and call signals if these cannot be generated by the communications terminal device itself;

or the safeguarding of the communication and of the handover process in comparison with the signaling generation, if the signaling generation can be carried out in the communications terminal device;

finally, the processing of the communications protocols and the event recognition and event allocation in relation to the switching.

Corresponding to the efficiency of the communications terminal devices connected with the subscriber module, more cost-advantageous implementations are possible there with partial savings of tone and call signaling generation; a matching of the prioritization of the program module structure is thus possible.

For the purpose of an identical treatment of all subscribers of the wireless communications system, for the processing of the events and program modules of each communications terminal device an equal portion of the system resources is made available. Thus, the conversion from a real-time system (the events are transmitted by the communications terminal devices under real-time conditions) to a system based on a distribution of processor resources (time-sharing) is ensured. The division of the program modules according to their priority thus does not take place for all the communications terminal devices together, but rather is carried out separately for each communications terminal device. An equal portion of the system resources is assigned to the active communications terminal devices, i.e. those that make demands on system resources, independently of the respectively present priorities of the respective program modules.

A further advantageous construction of the method of the invention provides that a communications terminal device that causes a system overload can be detected and processed separately on the basis of the requested system resources (processing resources in particular).

Loads on the communications system caused intentionally or unintentionally by communications terminal devices can thus be allocated to the responsible communications terminal device. If such an overloading of the communications system is ascertained in a state of high total load of the communications system, a total failure or the placing at a disadvantage of other connected communications terminal devices can be avoided by handling this load-intensive communications terminal device separately. The separate handling of a communications terminal device causing a system overload consists of a temporary withholding of system resources, by which a relief of the load on the subscriber module is achieved.

In the following, the method of the invention is explained more precisely on the basis of three block diagrams.

DESCRIPTION OF THE PREFERRED EMBODIMENTS

Figure 1:
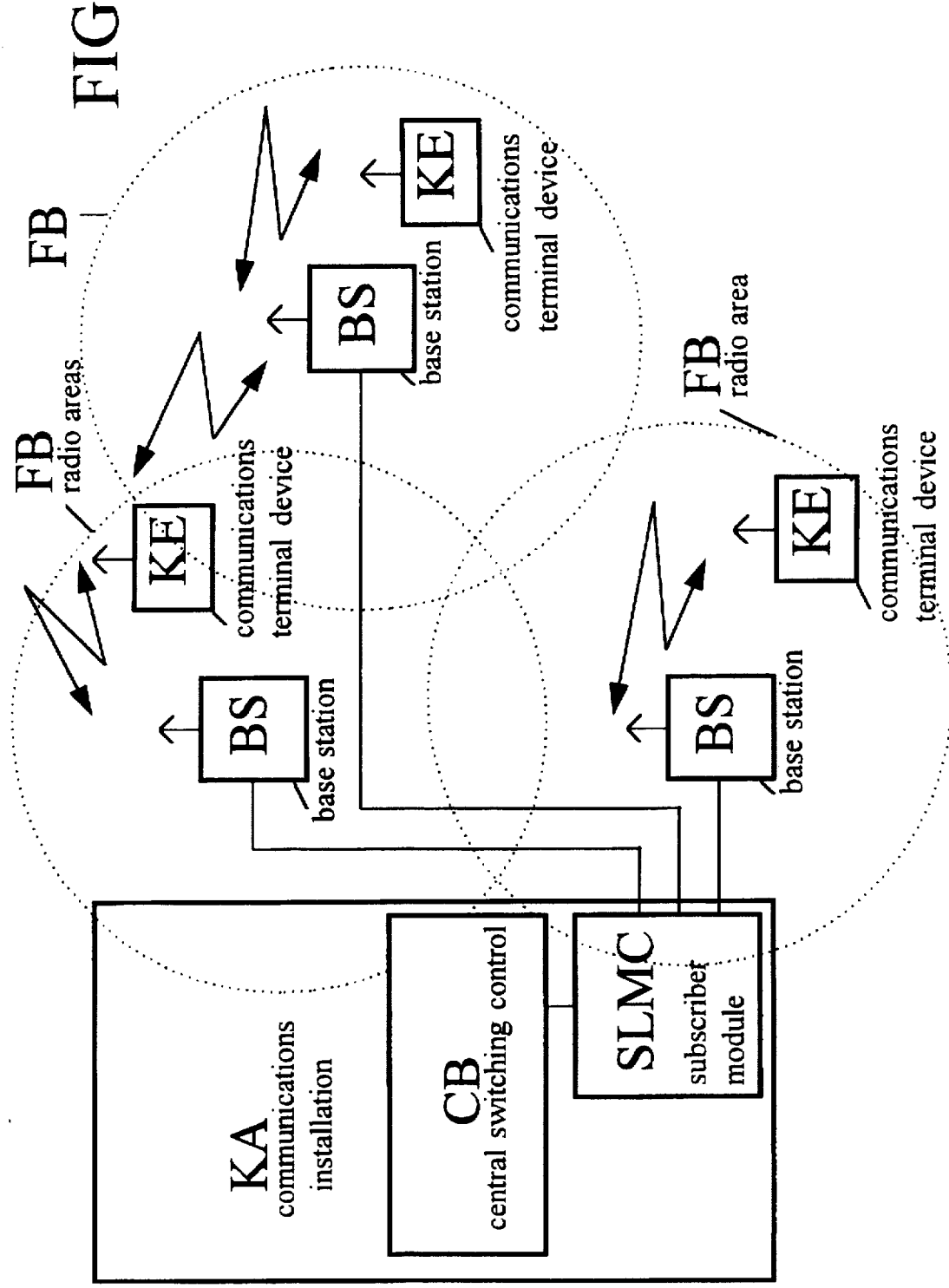
FIG. 1 is a schematic representation of a wireless communications system having indicated radio areas.

In FIG. 1, a communications installation KA comprising a central switching control CB and a subscriber module SLMC is shown. The communications installation KA is connected with base stations BS via the subscriber module SLMC. Each of these base stations BS can transmit and receive high-frequency signals. The carrier frequencies of these high-frequency signals are on the order of about 1.8 GHz for communications systems according to the DECT standard, for example. Corresponding to the locational conditions, the high-frequency signals transmitted by a base station BS can be received only at a determined distance from the base station BS. The same holds for the reception of high-frequency signals by the base station BS. The base station BS sets up a wireless communications connection with at least one communications terminal device KE, if this communications terminal device KE is located in the radio area of the base station BS and if the request for a call set-up is present at the communications terminal device KE or at another subscriber. The high-frequency signals sent by the communications terminal device KE can also be received by the base station BS only when the communications terminal device KE is located in a determined area around the base station BS. This area around a base station BS indicates the radio area FB of this base station BS. The boundaries of a radio area FB, shown in a simplified representation in FIG. 1 as circular radii, are as a rule irregular. The radio areas FB of different base stations BS also overlap. Furthermore, it must be noted that the boundaries of a radio area FB are not temporally stable, but rather change under the influence of disturbances and changes of the propagation conditions.

In wireless communications systems, it should be possible for the subscriber, i.e. the user of a communications terminal device KE, to move about freely even during a communications connection. This also includes the case in which a communications terminal device KE leaves the radio area FB of a base station BS and enters the radio area FB of another base station BS. The communications installation KA must thereby create a new communications path for the communications terminal device KE. This process is known as change of radio area (handover) and requires processing by the communications installation KA. The processing of a change of radio area between the radio areas FB of base stations BS that are connected to a subscriber module SLMC takes place in this subscriber module SLMC.

The quality of the wireless communication between the base station BS and the communications terminal device KE is continuously monitored. If the quality of this communications path ceases to meet requirements, the communications terminal device KE seeks a connection with another base station BS. During a communications connection, it is necessary to distinguish between the signaling information, which effects the setting-up and disconnection of a communications connection and the supporting of further performance features, and the useful information, e.g. speech information.

The communications terminal device KE thus first sets up a second communications path, via which only signaling information is exchanged. The base station BS of the new communications path then signals this new communications path to the subscriber module SLMC, and the setting-up of the communications connection via the new base station BS is prepared. Besides the continuing transmission of the useful information via the original base station BS to and from communications terminal devices KE, a connection for the useful information is first set up between the subscriber module SLMC and the new base station BS for the useful information to be transmitted to the communications terminal device KE, as is a wireless connection between the communications terminals device KE and the new base station BS for the useful information transmitted by the communications terminal device KE. The new base station BS then switches the connection for the useful information in both directions, from the subscriber module SLMC to the communications terminal device KE, and from the communications terminal device KE to the subscriber module SLMC. Finally, the new communications path for the useful information is completely enabled and the original communications path is shut off, by connecting through the new communications path and separating the original communications path in the subscriber module SLMC for the useful information coming in from the communications terminal device KE, and, as a second step, by taking the useful information from the new communications path in the communications terminal device KE and simultaneously giving up the original communications path. Finally, the original base station BS will also give up the maintenance of the original communications path.

During this change of radio area, disturbances can of course affect the wireless communications connection. Also, during an extremely rapid movement of the communications terminal device KE from one radio area FB into another radio area FB, the communications connection via the original communications path can be strongly disturbed and possibly interrupted, even before the new communications path has been set up. The method of the invention prevents this by means of the preferential processing of the handover process.

Figure 2:
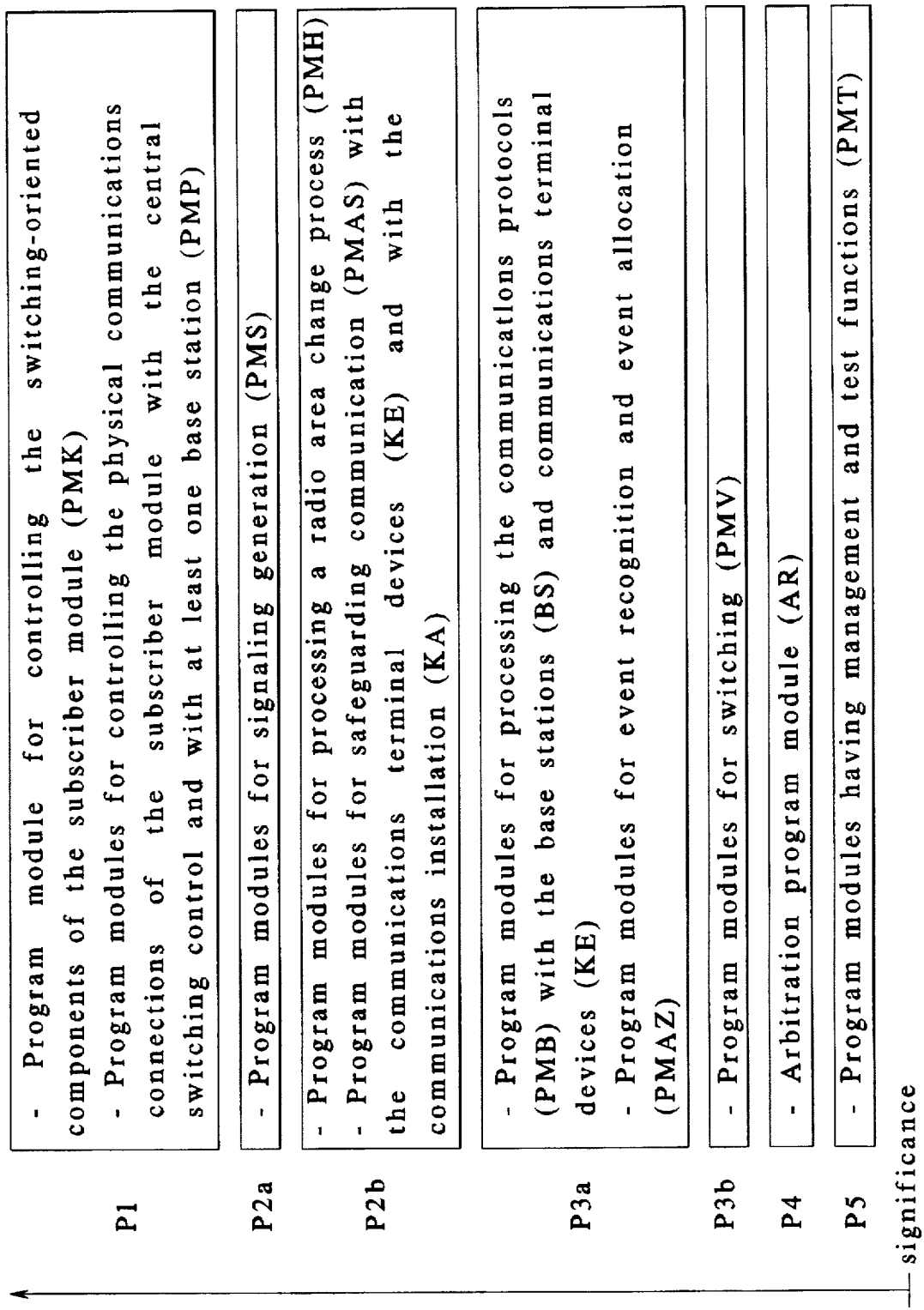
FIG. 2 is a schematic representation for the illustration of the priority structure of the program module.

FIG. 2 shows the result of the first procedural step of the invention, the allocation of priorities to the various functions that must be controlled in the subscriber module SLMC. Through this prioritization, a rapid processing of the handover process is achieved, and possible disturbances are thereby minimized. The functions of the subscriber module SLMC are thereby implemented through program modules.

The highest priority is given to program modules for controlling the switching-oriented components PMK of the subscriber module SLMC and to program modules for controlling the physical communications connection PMP of the subscriber module SLMC with the central switching control CB and with the at least one base station BS. The control of the switching of the subscriber modules SLMC forms the basis for all further functions. The control of the physical communications connections corresponds to the OSI layer 1, i.e. the bit transmission layer. Management of the physical medium takes place here.

The priority 2A is assigned to the program modules PMS for signaling generation. Here, signals for tone and call signaling are meant, i.e. signals that can be perceived by the user of a communications terminal device KE (the subscriber), and which thus belong to the system surface. In cost-advantageous variations of the communications terminal devices KE, these signals cannot be generated; the subscriber module SLMC thus supports this signaling generation with higher priority.

The next-lower priority 2B is given to program modules for processing of a radio area change process PMH of a communications terminal device KE connected wirelessly to a base station BS, and to program modules for safeguarding the communication PMAS with the communications terminal devices KE and with the communications installation KA. The program modules for safeguarding the communication PMAS implement functions that can be allocated to the OSI layer 2 (the safeguarding layer). Here the communications process is monitored for transmission errors. The radio area change process, which according to its function is to be assigned to the OSI layer 3 (the switching layer) is processed with the same significance as the program modules for safeguarding the communication PMAS. The radio area change process thus receives a clear upgrading and a preferential treatment relative to the system resources of the subscriber module SLMC.

Priority 3A is assigned to the functions of the switching layer (OSI layer 3), i.e. the program modules for processing the communications protocols PMB with the base stations BS and communications terminal devices KE, and to the program modules for event recognition and event allocation PMAZ of the events transmitted by the communications terminal devices KE. The switching functions are less time-critical. For this reason the program modules for switching PMV can be assigned priority 3B.

Priority 4 is assigned to an arbitration program module AR, which searches sequentially for the event memories individually allocated to the active communications terminal devices KE, and, each time it finds an event memory containing at least one event, takes an event from it and subsequently causes the program module corresponding to the event take to be executed. System resources are to be placed at the disposal of non-time-critical management and test functions only if a low total system load is present. Program modules having management and test functions PMT thus receive the lowest priority, namely priority 5.

Figure 3:
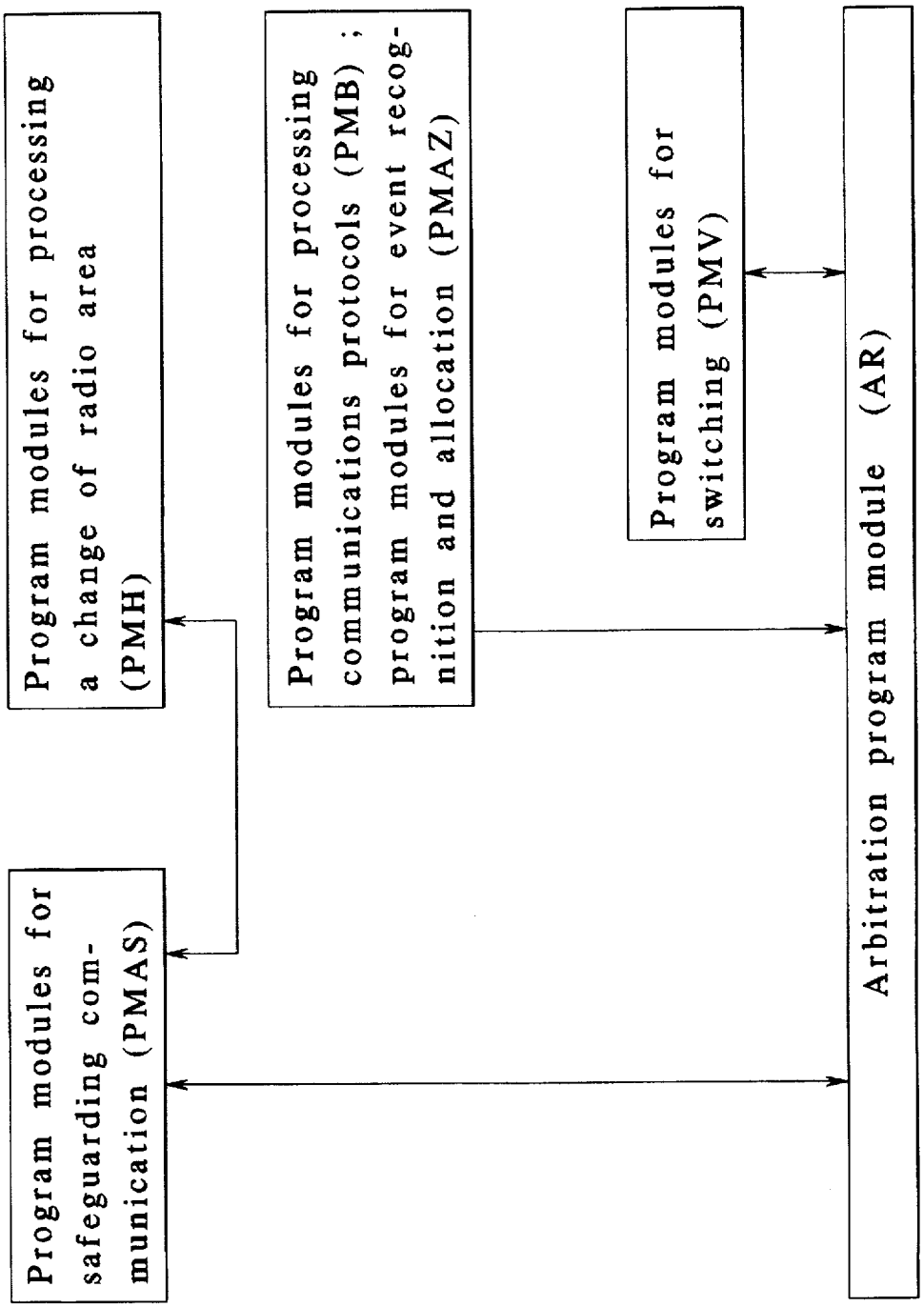
FIG. 3 is a flow diagram for the illustration of the essential programming steps in the processing of the program modules having priorities 2b to 4.

FIG. 3 shows the essential programming steps in the processing of the events. Incoming events are received and safeguarded with priority 2B by the program module for safeguarding communication PMAS. If such an event comes in, an arbitration program module AR is initiated, which is processed if no higher-prioritized functions interrupt this processing. The calling of high-priority program modules has priority over the calling of low-priority program modules by the arbitration program module AR. Each connected communications terminal device KE is allocated an equal portion of the system resources, i.e. for each communications terminal device KE there is a waiting list (process list) in which the program modules provided for processing are entered in a known way. In this waiting list, the arbitration program module AR determines that program module with the highest priority and causes it to be executed. The program modules for processing of a radio area change process PMH have the same priority as the program modules for safeguarding the communication PMAS and are directly processed, without calling in the arbitration program module AR. Corresponding to this mode of functioning, program modules for processing of a radio area change process PMH are processed more rapidly than the program modules for processing the communications protocols PMB and the program modules for event recognition and event allocation PMAZ, and these again are preferentially processed in comparison with the program modules for switching PMV. During the execution of one of the named program modules, the processing of the arbitration program module AR remains interrupted and is resumed afterwards.

Through the assignment of the same system resources to the individual active communications terminal devices KE (an active communications terminal device KE is a communications terminal device KE for which a communications connection is set up or disconnected or maintained) it becomes possible to determine the communications terminal devices KE that place particularly heavy demands on the system resources, e.g. through constant misoperation or defects. If the demand on system resources made by such a communications terminal device KE represents a system overload, system resources can be withheld from this communications terminal device KE. This can mean that no connection set-up is made for this communications terminal device KE, that various performance features are not made available or that an existing connection is cut off.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method for controlling functions for change of radio area of communications terminal devices in a program module structure of a subscriber module of a wireless communications system, the subscriber module being connected at a subscriber side with at least one base station for wireless connection of at least one communications terminal device, and at a switching side said subscriber module being connected with a central communications installation for creation of access to a communications network, comprising the steps of:

assigning a highest priority to program modules for controlling hardware components of the subscriber module-and to program modules for controlling physical communications connections of the subscriber module with a central switching control and with the at least one base station;

assigning a second highest priority to program modules for signaling generation of tone and call signals, to program modules for processing of a radio area change process of a communications terminal device connected tirelessly to a base station, to program modules for safeguarding communication with the communications terminal devices, and with the central communications installation;

assigning a third highest priority to program modules for processing communications protocols with the base stations and the communications terminal devices, to program modules for event recognition and event allocation of events transmitted by the communications terminal devices, and to program modules for switching;

assigning a fourth-highest priority to an arbitration program module for reading out of safeguarded and allocated events and for calling up of a program module designated by a located event;

assigning a lowest priority to program modules having management and test functions; and processing the program modules according to said assigned priorities.

2. The method according to claim 1, including the step of assigning priorities within the program modules having said second highest priority such that: a priority of the program modules for signaling generation of tone and call signals is higher than a priority of the program modules for processing of a radio area change process of a communications terminal device connected wirelessly to a base station (BS), and higher than a priority of the program modules for safeguarding the communication with the communications terminal devices and with the communications installation.

3. The method according to claim 1, including the step of assigning priorities within the program modules having the second-highest priority such that:

a priority of the program modules for processing of a radio area change process of the communications terminal device connected wirelessly to the base station a priority of the program modules for safeguarding communication with the communications terminal devices and with the communications installation are higher than a priority of the program modules for the signaling generation of tone and call signals.

4. A method according claim 1, including the step of assigning a gradation within the program modules having the third highest priority, such that:

a priority of the program modules for processing the communications protocols with the base stations and with the communications terminal devices and a priority of the program modules for event recognition and event allocation of the events transmitted by the communications terminal devices are higher than a priority of the program modules for switching.

5. The method according to claim 1 wherein an equal portion of system resources is made available for the processing of the events and of the program modules of each communications terminal device.

6. The method according to claim 1 wherein a communications terminal device that causes a system overload is detected (on a basis of system resources requested) and handled separately.

7. The method according to claim 6 wherein the separate handling of the communications terminal device causing the system overload compares a temporary withholding of system resources by which a relief of the load on the subscriber module is achieved.

8. A system for controlling functions for change of radio area of a communications terminal device comprising:

a subscriber module having a program module structure and connected at a subscriber end with at least one base station for wireless connection to at least one communications terminal device and at a switching end with a central communications installation for creating access to a communications network;

means for allocation of priorities to program modules of the program module structure such that a highest priority is allocated to program modules for controlling hardware components of the subscriber module and to program modules for controlling physical communications connections of the subscriber module with a central switching control and with the at least one base station, a second highest priority is allocated to program modules for signaling generation of tone and call signals, to program modules for processing of a radio area change process of the communications terminal device connected wirelessly to the base station, and to program modules for safeguarding communication with the communications terminal device and with the central communications installation, a third highest priority is allocated to program modules for processing of communications protocols with the at lest one base station and with the communications terminal device, to program modules for event recognition and event allocation of events transmitted by the communications terminal device and to program modules for switching, a fourth highest priority is allocated to an arbitration program module for reading out safeguarded and allocated events and for calling up a program module designated by a located event, and a lowest priority is allocated to program modules having management and test functions; and means for processing the program modules according to the allocated priorities.

9. The system according to claim 8 further including:

the means for allocation of priorities to program modules are designed so that during allocation of priorities:

a priority of the program modules for the signaling generation of tone and call signals is higher than a priority of the program modules for processing of a radio area change process of the communications terminal device connected wirelessly to the base station and of the program modules for safeguarding the communication with the communications terminal device and with the communications installation.

10. The system according to claim 8 wherein said means for processing the program modules according to the allocated priorities is designed so that an equal portion of system resources is made available for the processing of the events and program modules by a program system of each communications terminal device.

11. The system according to claim 8 further including a means for handling overload situations and which is constructed so that a communications terminal device that causes a system overload can be detected and handled separately by a program system through at least temporary and partial withholding of system resources program modules based on requested system resources.

* * * * *